Nov. 7, 1933.                J. E. WILSON                1,934,111
                          GRASS SEED HARVESTER
                          Filed May 4, 1933             3 Sheets-Sheet 1
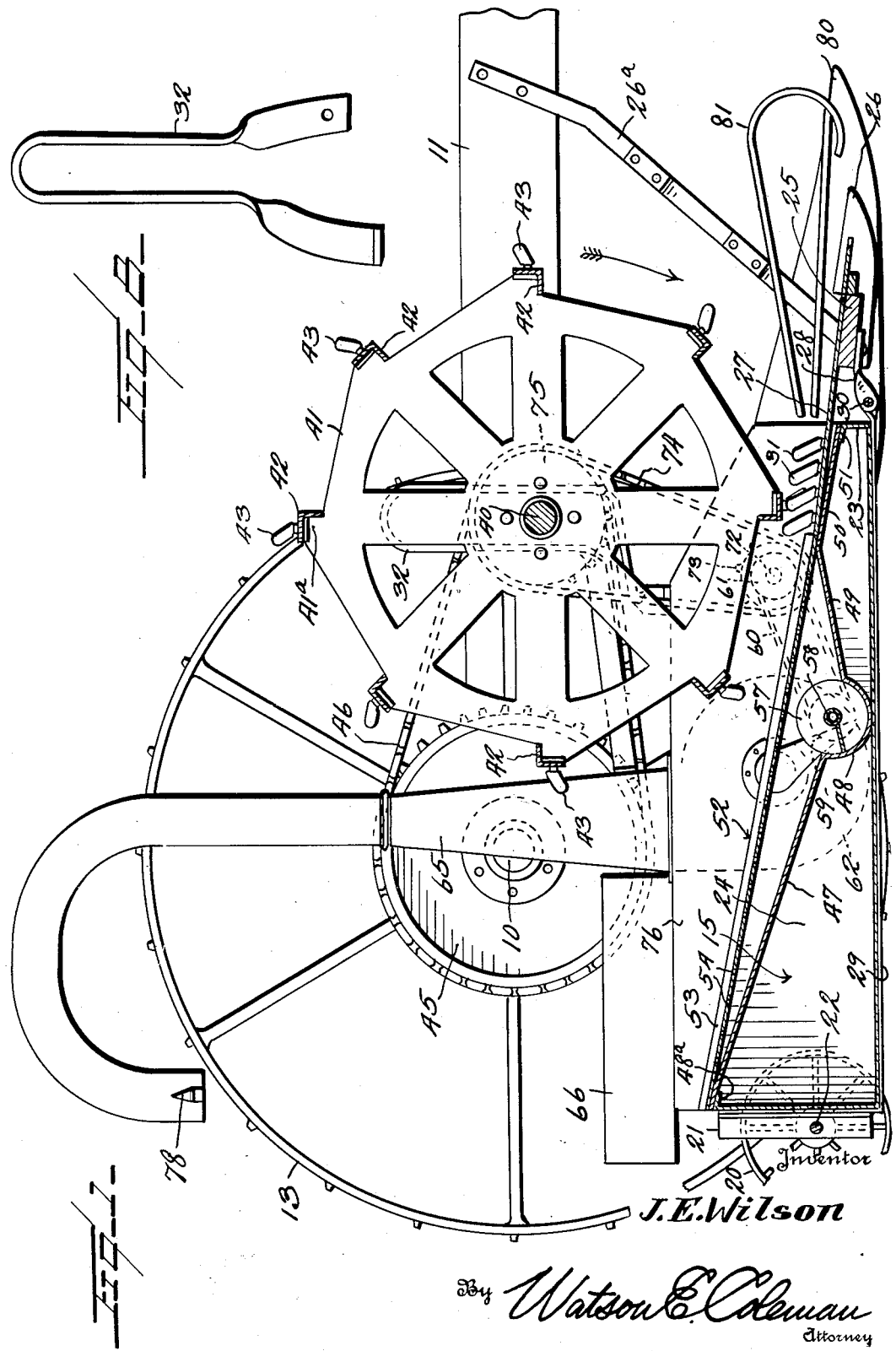

Nov. 7, 1933.   J. E. WILSON   1,934,111
GRASS SEED HARVESTER
Filed May 4, 1933   3 Sheets-Sheet 2
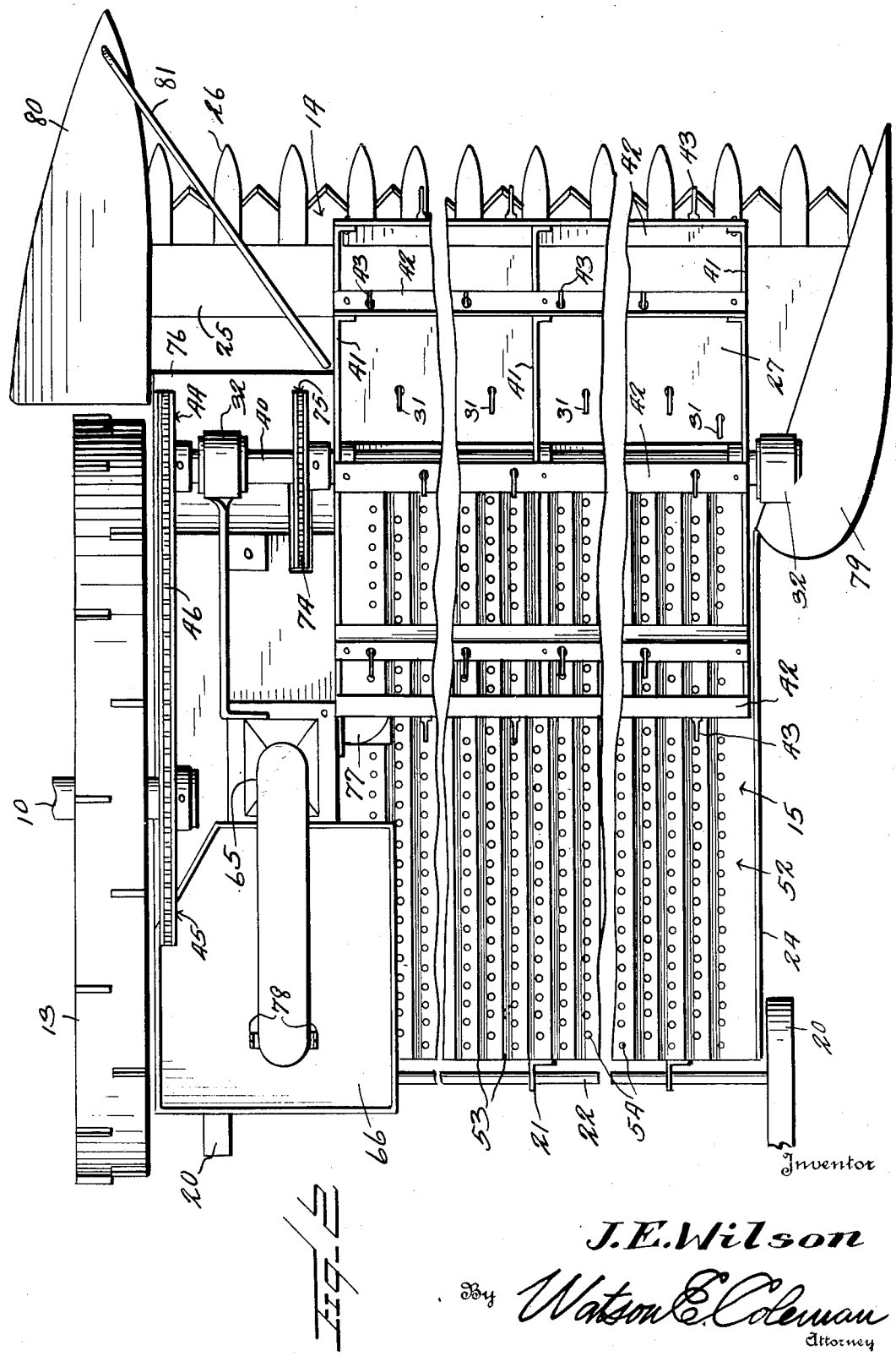

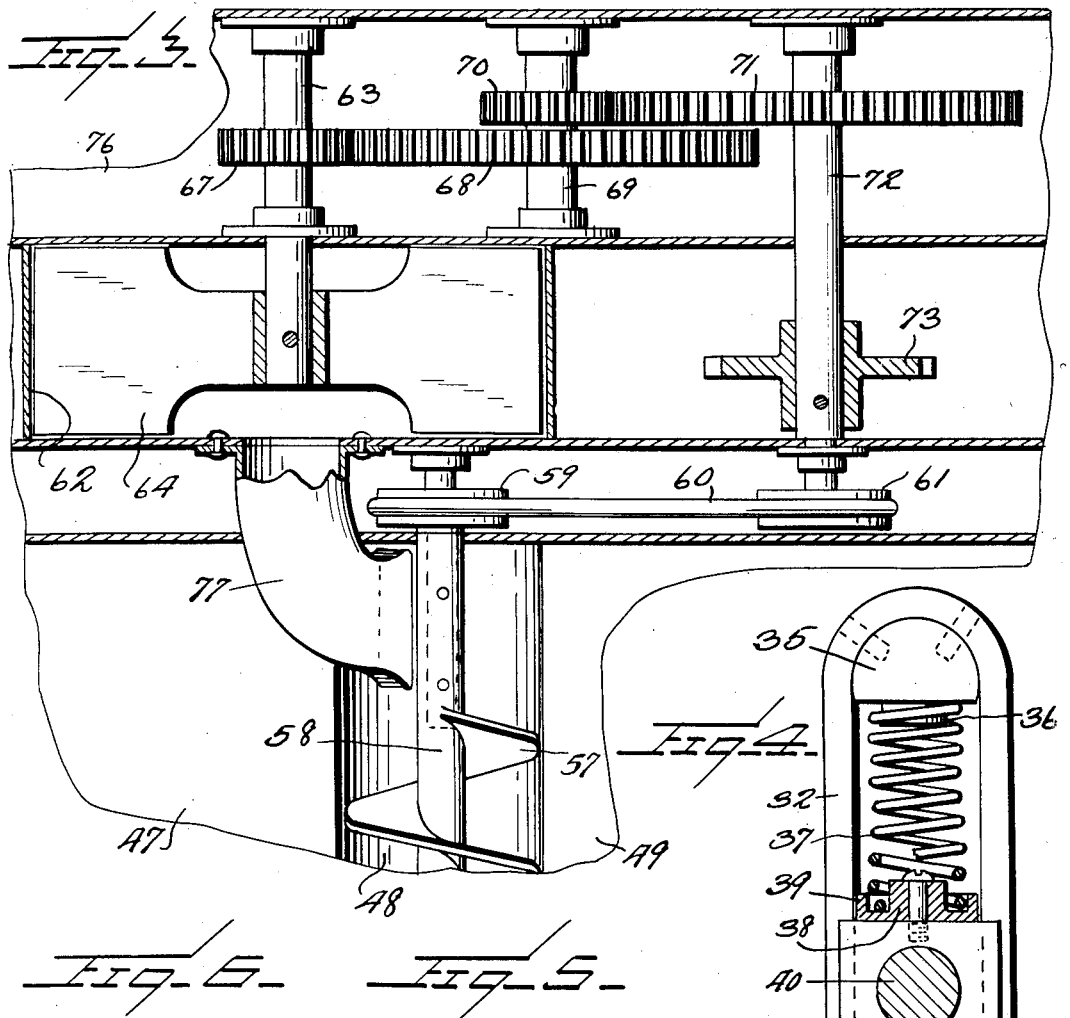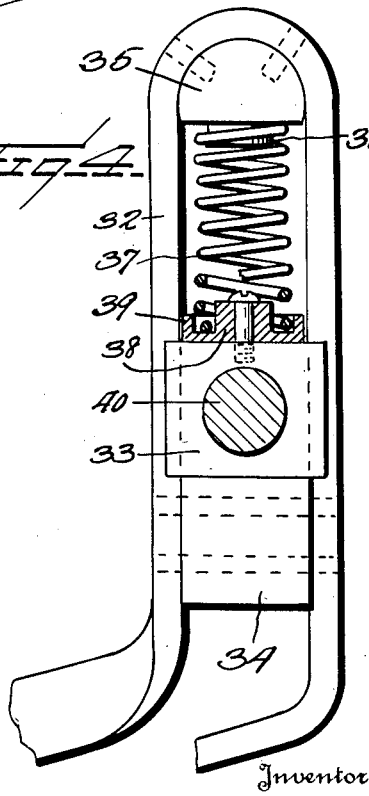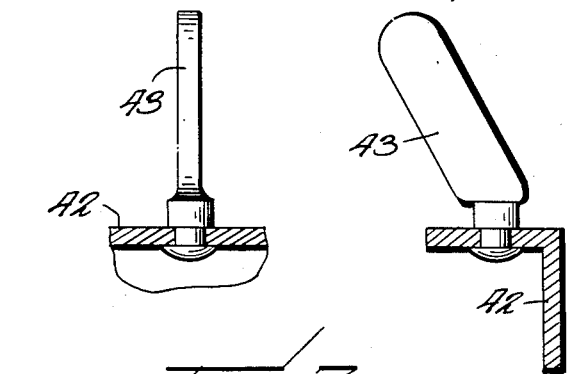

Patented Nov. 7, 1933

1,934,111

UNITED STATES PATENT OFFICE 1,934,111

GRASS SEED HARVESTER

James E. Wilson, Hickory, Ky., assignor of one-half to Ottis T. Griffith, Detroit, Mich.

Application May 4, 1933. Serial No. 669,411

9 Claims. (Cl. 56—207)

This invention relates to improvements in seed catchers designed to be attached to harvesting machines and particularly to means for catching Korean Lespedeza clover seed.

In machines of this character, it is usual to provide a perforated seed pan into which the seed is discharged, the seed being thrashed from the stalk by a beater or reel and one of the objects of my invention is to provide improved means for thrashing the seed from the stalks, collecting the seed and blowing the seed into a bag or other receptacle.

A further object is to provide a seed collecting pan so constructed that the seed slides by gravity downward to a laterally operating conveyor by which the seed is conveyed to the blower and to provide a perforated top for the pan which is corrugated by corrugations extending longitudinally of the machine so that the seed will not be blown away or blown off the top of the pan.

Another object is to provide an improved reel for this purpose which constitutes a beater and provide improved means for mounting this reel or beater, which means will permit vertical movement of the beater, and a still further object is to improve the details of a machine of this character, render it more effective, permit it to be more cheaply made, and render it more mechanically perfect.

Other objects will appear in the course of the following description.

My invention is illustrated in the accompanying drawings, wherein:—

Figure 1 is a vertical longtudinal sectional view of a seed harvesting machine constructed in accordance wth my invention;

Figure 2 is a top plan view of the structure shown in Figure 1;

Figure 3 is a fragmentary horizontal section through the gear casing and fan and showing a portion of the seed receiving pan and elevator;

Figure 4 is an elevation of one of the supports for the reel bearing, the reel shaft being shown in section;

Figure 5 is a transverse section through one of the bars of the reel showing one of the teeth in side elevation;

Figure 6 is a fragmentary longitudinal section through the reel bar showing the tooth in edge elevation;

Figure 7 is a transverse fragmentary section through the seed pan;

Figure 8 is an elevation of the outer reel supporting member.

In these drawings, 10 designates the axle of a mower to which is attached the usual draft tongue 11 and which carries at its outer end a wheel not shown and on its inner end a wheel 13. Mounted forwardly of the wheel 13 and extending laterally therefrom is a cutter mechanism of the usual type which is indicated generally by the numeral 14.

Any suitable means may be provided for reciprocating the cutter bar from the traction element of the mower and, as this forms no part of this invention, no detailed means for driving this cutter bar has been shown.

My seed collecting attachment includes a pan designated generally 15 which is supported at its rear end by the small wheels 20. These are mounted on the angle iron supports 21 riveted, bolted or otherwise attached to the rear end of a seed pan, the wheels being carried by a transversely extending axle 22. The forward end of the seed pan is provided with a front wall 23 and the seed pan also has the lateral walls 24. The forward end of the pan is supported by the finger plate 25 having fingers 26 thereon and over which the cutter bar operates, this finger plate being supported by a brace or braces 26ª, this being formed of adjustable sections so that it may be shortened or lengthened to thus support the fingers very close to the ground or at any desired distance therefrom.

Attached to the finger plate 25 and extending upward and rearward therefrom is the thrashing plate 27 which extends over the front wall 23 of the seed pan. Also attached to the finger plate 25 on the lower surface thereof are the hinge links 28 having vertically extending ears at their rear ends and extending beneath the pan are the pan supporting bars 29, the forward ends of these bars being twisted so as to provide ears overlapping the ears of the hinge links 28 and pivoted thereto by an elongated hinge pin 30. The rear ends of the supporting irons 29 extend upward to the top of the pan or nearly to the top of the pan as desired and are riveted or bolted thereto at any desired number of points. Thus the pan is supported at its rear and forward ends, the forward end being adjustable vertically.

The thrashing plate 27 rearward of the front wall 23 of the pan is provided with the upwardly projecting teeth or paddles 31, these teeth being preferably arranged in rows and there being preferably four sets of these teeth. These teeth have shanks which extend through the thrashing plate 27 and are bolted thereto, these teeth being flattened and being extended rearwardly.

Extending upward on each side of the forward end of the seed pan is an approximately U-shaped reel shaft frame 32. Each frame has laterally disposed legs. The outside frame has the lower ends of its legs twisted in a plane at right angles to the bar forming the frame and laterally angled as shown in Figure 8 while the frame for the inside end of the reel shaft has a vertical U-shaped portion but has its legs extending angularly in the same direction but slightly divergent, one of the legs extending straight downward as shown in Figure 4. These legs are designed to be attached to opposite sides of the cutter bar, and in the U-shaped portions of each of these legs there is disposed a bearing 33 which is preferably of bronze, rectangular in cross section and recessed on each side face for the reception of the legs of the corresponding reel shaft frame. Each bearing or box 33 is supported upon a supporting block 34 which is riveted, bolted or otherwise engaged with the legs of the corresponding reel shaft frame.

Disposed in the upper end of each reel shaft frame and bearing against the bight thereof is a spring guide or support designated generally 35, this having a central hub 36 around which the upper end of the spring 37 engages. The lower end of the spring engages within a spring guide 38 which rests upon the block 33 and which has a central upwardly projecting hub to extend into the coiled spring 37, and has a flange 39 to surround the lower end of the coil spring, the spring thus holding this guide 38 from lateral movement. The spring urges the bearing block or box 33 downward against the supporting member 34.

Carried in the bearings 33 is the reel shaft 40 which carries upon it three reel wheels 41. These are all alike. The reel wheels are made of relatively thin metal and the periphery of each wheel is formed to provide an outwardly projecting series of teeth 41a adapted to engage within the angle irons 42 which are attached to these reel wheels at spaced intervals and extend longitudinally of the reel and constitute reel bars. Mounted upon these angle irons are the beating or thrashing teeth 43, each of which has a reduced shank extending into or through the corresponding angle iron 42, the outer ends of each of these teeth being flattened and rearwardly bent with relation to the direction of rotation of the reel. It will be seen that the wheels 41, and the connecting bars 42, with their thrashing teeth constitute a beater or reel and that as the reel is rotated in the direction of the arrow in Figure 1, the teeth 43 on the reel will pass between the rows of teeth 31 on the thrashing plate and thus beat out the seed from the grass, this being particularly necessary with Korean Lespedeza.

The reel shaft 40 also carries upon it the sprocket wheel 44 driven from a sprocket 45 mounted on the shaft of the inner traction wheel 13, a sprocket chain 46 connecting these sprocket wheels.

Disposed within the seed pan and above the bottom thereof is a conveyor pan 47 which at its rear end rests upon a flange 48a formed on the rear wall of the seed pan and which extends downward and forward to a point midway of the seed pan.

It there connects with the arcuate bottom 48 of a transverse screw conveyor, this arcuate bottom 48 resting upon the bottom of the seed pan and from the forward edge of this arcuate bottom extends a section 49 of the seed pan which extends to and opens upon the forward section of the top 50 of the seed pan which at its forward end rests upon a flange 51 formed upon the forward wall of the seed pan. It will be understood that the section 47, the trough 48 and the section 49 may all be formed of one piece of metal and that the rear, forward and lateral margins of this bottom are riveted, bolted or otherwise connected to the body of the pan in any suitable manner.

Disposed to extend from the forward end of the section 49 of the conveyor pan or bottom and extending upward to the rear end of this conveyor, that is, the rear wall of the seed pan, is a top plate designated generally 52. This top plate is longitudinally corrugated, the corrugations being designated 53, these corrugations being preferably V-shaped corrugations and the corrugations extend the entire length of the plate. Each of the valleys of the corrugations is perforated with a series of holes 54, these holes being preferably one-fourth of an inch in diameter and being preferably disposed one-half inch apart from each other on centers. The holes 54 of one valley are preferably disposed in staggered relation to the holes of the next adjacent valleys. The lateral margins of this corrugated plate are upwardly turned as at 55 for attachment to the seed pan. The conveyor plate 50 is attached to the walls of the pan in any suitable manner as by welding, bolting or the like.

It will be seen that the thrashing plate 27 extends over the section 50 so that the seed thrashed from the grass will be discharged on to the corrugated plate 52 and will pass through the perforations in this plate on to the conveyor plate sections 47 and 49 by which they will be discharged by gravity into the conveyor trough 48.

Disposed within the conveyor trough 48 and extending entirely across the seed pan is a spiral conveyor 57 of any usual or suitable type mounted upon the shaft 58. This shaft carries upon it the pulley 59 from which a belt 60 leads to a pulley 61 on a counter-shaft. Thus the conveyor is driven and conveys the seed laterally and discharges it into a fan housing 62.

Extending through the housing is a fan shaft 63 and mounted thereon is the rotary fan 64 shown as having radial blades but it is to be understood that it may have blades of any desired form. The fan housing 62 has a tangentially disposed spout 65 which extends upward and then downward and discharges toward a sack supporting platform or rest 66. It will be understood, of course, that this spout 65 is shown as formed of sections, though it might be formed of a single part without departing from the spirit of the invention. The shaft 63 carries upon it a gear wheel 67 which is engaged by a gear wheel 68 mounted upon a shaft 69, this shaft in turn carrying a pinion 70 which engages with a gear wheel 71 mounted upon a shaft 72. This shaft also carries upon it the sprocket wheel 73 from which a sprocket chain 74 extends to a sprocket wheel 75 mounted upon a reel shaft 40 which in turn is driven from a traction wheel.

It will be seen that the gearing between the real shaft and the fan shaft is a multiplying gearing so that the fan shaft is caused to travel at a high rate of speed. The several gears stated are mounted within a gear box 76 supported on the side of the seed pan or in any suitable manner. While I have described the conveyor 57, as if it discharged directly into the lower end of the fan housing, it is to be understood, however, that this is not the case. It discharges into the fan housing but through a duct or suction connection 77 which at one end is connected to one end of the conveyor trough and at the other end opens into the interior of the fan housing. The grain spout 65 at its upper end discharges downward against the sack supporting table and the discharge end of this spout is provided with means 78 whereby a bag may be connected to the end of the spout so that the grain may be discharged thereinto. The cutter bar is provided at its inside and outside ends with the usual shoes 79 and 80 and connected to the tip of the shoe 80 and extending upward and inward to the frame of the machine is the dividing guard 81 constructed as shown in Figure 1.

It will be seen that I have provided a seed harvesting attachment for mowing machines which may be readily attached or moved or built in as part of the mowing machine which includes a seed pan and a beater or reel operating thereover and means for causing the seed under the influence of gravity to be discharged into a conveyor trough from which it is carried to the fan and discharged from the seed spout into a bag. It will further be seen that the pan is so constructed that wind is not likely to blow the seed off of the top of the seed pan but that the seed will be held by the corrugations of this top and will gradually move down the valleys of the corrugations and pass through the apertures therein on to the plate below whereby it is carried to the conveyor.

It is to be noted that the reel has eight bars 42 with a row of teeth on each bar, the teeth being sloped backward and that these teeth have to pass between four rows of teeth 31. This permits the reel to be run relatively slowly and yet accomplish the same work as would be accomplished were fewer rows of teeth provided and the reel run faster. By sloping the teeth, the teeth will not gather up the hay and ball the hay up as it would if the teeth were set straight up and down. The reel and the teeth 31 act to knock the seed out of the hay and the hay is pushed backward as the reel turns. It is particularly important that the teeth be made flat and round pointed in order to beat the seed out of the hay and at the same time shed the hay off the teeth. The bearing structure shown in Figure 4 is of particular advantage in that the downward movement of the reel is limited by block 34 but if heavy, thick hay is being operated on, the reel will rise up a little to give the hay more room to pass between the teeth, the springs 37 pushing it down when the hay gets thin. The reel gets its power direct from the lower axle, thus giving both wheels of mower the same power to pull and balance the mower.

Another advantage of the corrugated top 53 shown in Figure 7 is that there is no danger of the hay sweeping the seed off the back of the pan because the hay does not go down into the valleys of the corrugations where the seed does. If the pan top was flat, the hay would sweep a great deal of the seed off. It will be seen that the pan is free to work up and down over rough places by reason of the pivot 30 without affecting or being affected by the cutter bar.

While I have illustrated the reel supports as being attached to the seed pan, I wish it understood that the reel supports might be attached to the cutter bar so that the reel would be supported largely by the cutter bar without departing from the spirit of the invention as defined in the appended claims.

What is claimed is: —

1. The combination with a mower having a cutting bar, of a seed pan mounted rearward of the bar but hingedly connected thereto, wheels supporting the rear end of the pan, means for vertically adjusting the cutter bar and the forward end of the pan, the pan being open at its front end and having side walls and a rear wall, a downwardly and forwardly extending cover for the pan disposed between the rear wall and the forward end of the pan, the forward portion of the cover being imperforate, the rearward portion of the cover being longitudinally corrugated and perforated in the valleys of the corrugations, a false bottom disposed below the cover and extending downward and forward, then formed to provide a conveyor trough and then extending upward and forward and intersecting the cover at the rear end of the imperforate portion thereof, a conveyor disposed in said trough and carrying the seed collected therein laterally out of the pan, and a reel rotatably mounted above the forward end of the pan and having transverse bars and teeth projecting therefrom, a thrashing plate extending rearward from the cutting bar and over the imperforate portion of the pan, and teeth mounted thereon between which the teeth on the reel are adapted to pass.

2. The combination with a mower having a cutting bar and having traction wheels, of a seed pan mounted rearwardly of the bar and hingedly supported thereon, wheels supporting the rear end of the seed pan, a perforated cover plate for the pan, a laterally extending conveyor disposed beneath the cover plate, a fan housing having an upwardly extending discharge spout, means for conducting seed from the conveyor to said fan housing, a reel mounted above the forward end of the seed pan, vertically extending U-shaped supports attached to and disposed on each side of the seed pan and constituting guides, a shaft for the reel, bearings mounted in said guides and within which the ends of the shaft are supported, a support carried by said U-shaped guides and limiting the downward movement of the bearing, and springs in the upper portion of the U-shaped guides operatively engaging the bearings and the upper ends of the U-shaped guides and urging said bearings and the shaft downward.

3. The combination with a mower having a cutter bar and a seed pan mounted rearward of the bar, of a reel mounted above the seed pan and rearward of the cutter bar, the seed pan having upwardly extending teeth and the reel having teeth, the reel being mounted for vertical movement.

4. The combination with a mower having a cutter bar and a seed pan mounted rearward of the bar, of a reel mounted above the seed pan and rearward of the cutter bar, the seed pan having upwardly extending teeth and the reel having teeth, the reel being mounted for vertical movement away from the seed pan, springs urging the reel downward toward the seed pan, and means limiting the downward movement of the reel.

5. The combination with a mower having a cutter bar, of a seed pan mounted rearwardly of the bar, vertically extending U-shaped supports disposed on each side of the seed pan and constituting guides, a shaft for the reel, bearings for the shaft mounted in said guides, a member carried by each guide and limiting the downward movement of the bearing, and springs in the upper portion of the guides engaging the bearings and the upper ends of the U-shaped guides and urging said bearings and the shaft downward against said members.

6. The combination with a mower having a cutter bar and having traction wheels, of a seed pan hingedly connected to the cutter bar and trailing behind the same, means supporting the rear end of the seed pan, a laterally extending conveyor extending across the seed pan, a fan housing having an upwardly extending discharge spout and into which the conveyor discharges, a reel mounted above the forward end of the seed pan, means for driving the reel from one of the traction wheels of the mower, and means for driving the conveyor and the fan from the reel shaft.

7. The combination with a mower having a cutter bar, of a seed pan mounted rearwardly of the cutter bar, a top for said pan having apertures therethrough, the forward portion of the top being imperforate, a plurality of upwardly projecting teeth disposed upon the imperforate portion of the top, a reel rotatably mounted above said teeth and teeth carried by said reel and passing between the teeth on the pan top when the reel is rotated.

8. The combination with a mower having a cutter bar and a seed pan mounted above the cutter bar and rearward of the cutter bar, the seed pan having upwardly and rearwardly extending transversely flattened teeth and the reel having outwardly extending teeth arranged to pass between the teeth on the seed pan, the teeth on the reel being inclined reversely to the direction of rotation of the reel, and being transversely flattened.

9. The combination with a mower having a cutter bar, of a seed pan disposed rearward of the cutter bar and hingedly connected thereto for vertical oscillation, wheeled means for supporting the rear end of the pan above the ground, a perforated cover for the pan, a reel mounted above the forward end of the seed pan and having teeth, teeth mounted upon the forward end of the seed pan and between which the teeth on the reel pass when the reel is rotated, and means for driving the reel from one of the traction wheels of the mower.

JAMES E. WILSON.